United States Patent [19]

Yagi et al.

[11] Patent Number: 4,656,711

[45] Date of Patent: Apr. 14, 1987

[54] METHOD FOR DETERMINING PISTON FORM FOR AN INTERNAL COMBUSTION ENGINE

[75] Inventors: Toshiro Yagi, Higashihiroshima; Kiyomi Sumida, Hiroshima, both of Japan

[73] Assignee: Mazda Motor Corporation, Hiroshima, Japan

[21] Appl. No.: 597,550

[22] Filed: Apr. 6, 1984

[30] Foreign Application Priority Data

Apr. 11, 1983 [JP] Japan .................................. 58-64383

[51] Int. Cl.$^4$ ........................ B23P 15/10; B23Q 17/00
[52] U.S. Cl. .................................. 29/156.5 R; 29/404; 29/407; 29/458; 29/527.2; 76/107 R; 264/40.1; 264/162; 264/219; 264/236; 427/355
[58] Field of Search .................. 29/156.5 R, 404, 407, 29/445, 458, 527.1, 527.2; 76/107 R; 264/40.1, 68, 162, 219, 236; 427/355

[56] References Cited

U.S. PATENT DOCUMENTS

| 1,631,359 | 6/1927 | Brown ............................ 29/156.5 R |
| 2,492,935 | 12/1949 | McCulloch et al. .................. 29/404 |
| 2,984,895 | 5/1961 | Griffin, Jr. et al. ........ 29/156.5 R X |
| 3,774,277 | 11/1973 | Bentley-Leek .................... 29/404 X |
| 3,945,893 | 3/1976 | Ishimori et al. ............. 204/129.1 X |
| 4,067,093 | 1/1978 | Schumacher et al. ......... 29/156.5 R |
| 4,450,610 | 5/1984 | Schäper .......................... 29/156.5 R |
| 4,494,448 | 1/1985 | Eystratov et al. .......... 29/156.5 R X |

FOREIGN PATENT DOCUMENTS 39916 3/1982 Japan .

OTHER PUBLICATIONS

Seitzinger, Ronald C., "Coatings That Cut Friction", Machine Design, vol. 48, No. 24 (Oct. 21, 1976).
Solid Lubrication Handbook, Sections 4.5 and 4.5.1; Saiwai Shobo, Japan (Apr. 25, 1978); p. 119 (translation).
Toshikatsu Ishikawa and Toshio Shimada; "Polycarbon Monofluoride Production Method and Application", New Material & New Processes, vol. 2 (1983); pp. 386-392.
McGraw Hill Dictionary of Scientific and Technical Terms, Second Edition; p. 624; "Fluorocarbon".

Primary Examiner—Mark Rosenbaum
Assistant Examiner—Ronald S. Wallace
Attorney, Agent, or Firm—Burns, Doane, Swecker & Mathis

[57] ABSTRACT

The disclosure is directed to an improved method of determining a configuration or form of a piston employed for an internal combustion engine, based on investigations into and finding of a novel composite material which imparts a sufficiently high degree of smoothness to the surface of an abraded covering layer for a piston and can quickly provide a desired piston profile even for a small-sized gasoline engine, etc.

2 Claims, 9 Drawing Figures (×500)

(×500)

(×500)

METHOD FOR DETERMINING PISTON FORM FOR AN INTERNAL COMBUSTION ENGINE

BACKGROUND OF THE INVENTION

The present invention generally relates to internal combustion engines and more particularly, to a method of determining a configuration or profile of a piston employed in an internal combustion engine, which is so arranged that, with a covering layer which may be comparatively readily abraded being formed on an outer peripheral surface of a piston, the piston is built in an internal combustion engine for operation, so that the configuration of the piston obtained after abrasion of the above covering layer is regarded as the form of the piston required for designing.

Conventionally, for determining a piston profile for an internal combustion engine as referred to above, there has been disclosed, for example, in Japanese Patent Application Tokugansho No. 55-116340 (Japanese Laid Open Patent Application Tokkaisho No. 57-39916), a method in which a composite material including epoxy resin, flake aluminum and molybdenum disulfide is applied onto an outer peripheral surface of a piston for baking at a predetermined temperature so as to form a covering layer thereon.

In the known method as described above, however, there have been problems as described hereinbelow.

In the first place, when the piston formed with the covering layer as described above is to be subjected to the operation, the outer surface thereof is not sufficiently smooth for the actual operation. Moreover, in the case where the internal combustion engine to be dealt with for the determination of the piston profile or form is of an engine of a type having a small compression pressure, for example, a gasoline engine with a less displacement for a small-sized motor vehicle, it takes a considerable time until the covering layer formed on the outer peripheral surface of the piston is abraded to a desired configuration, since an external force acting on such covering layer is generally small, and if the content of molybdenum disulfide is reduced or temperature for baking the composite material is lowered, the smoothness on the external surface of the piston as referred to above is still more reduced. Particularly, when the baking temperature is excessively lowered, another disadvantage such as separation of the covering layer during operation may possibly take place.

SUMMARY OF THE INVENTION

Accordingly, an essential object of the present invention is to provide an improved method of determining a piston profile or form for an internal combustion engine based on investigations into and the findings of a novel composite material which imparts a sufficiently high degree of smoothness to the surface of an abraded covering layer for a piston and can quickly provide a desired piston form even in a small-sized gasoline engine, etc., with a substantial elimination of disadvantages inherent in the conventional methods of this kind.

Another important object of the present invention is to provide a method of determining a piston form for an internal combustion engine as described above, which is simple in steps and can be readily introduced into designing of pistons for internal combustion engines.

In accomplishing these and other objects, according to one preferred embodiment of the present invention, there is provided a method of determining a form of a piston for an internal combustion engine, which includes the steps of preparing a prototype piston having dimensions slightly smaller than those of a finally processed piston, applying onto an outer peripheral surface of said prototype piston, a composite material composed of 25 to 45% by weight of flake aluminum, 2 to 30% by weight of at least one kind of solid lubricant selected from the group of carbon fluoride (also known as graphite fluoride but more correctly referred to as polycarbon monofluoride) and graphite, and a remainder of epoxy resin, heating the prototype piston thus applied with the composite material at temperatures in the range of 90° to 230° C. for more than 20 minutes to form a covering layer on the prototype piston, and thereafter, incorporating said prototype piston thus formed with the covering layer into the internal combustion engine for operation thereof for a predetermined period of time, whereby the piston configuration obtained through abrasion of said covering layer during the operation is regarded as a piston form required for designing.

By the steps according to the present invention as described above, an improved method of determining the piston form for an internal combustion engine has been advantageously presented for actual applications.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like portions are designated by like symbols in the accompanying drawings.

In the first place, it is to be noted that physical properties required for a covering layer to be formed on an outer peripheral surface of a piston are as follows.

(a) The covering layer should have a sufficient heat resistance so as not to be deteriorated in quality at 300° C.

(b) Upon sliding movement over an inner wall of a cylinder of the internal combustion engine, the covering layer itself should be abraded without impairing the mating cylinder wall.

(c) In the above case, the abraded surface of the covering layer should have a smoothness higher than that in the conventional covering layers, with a larger amount of abrasion.

(d) The covering layer itself, however, should have a superior resistance against the abrasion to a certain extent.

(e) During contact with the inner surface of the cylinder, the covering layer should be free from seizure or separation due to an insufficient resistance against shearing.

(f) The covering layer should be readily formed into a thick layer or laminated layers.

(g) The covering layer should preferably be provided with a certain extent of resiliency and a buffering function.

(h) Simultaneously, the covering layer should have a sufficient adhering force (bonding force) with respect to a piston made of aluminum material.

For meeting the physical properties as described above, the present inventors have developed the composite material referred to earlier and composed of 25 to 45% by weight of flake aluminum, 2 to 30% by weight of at least one kind of solid lubricant selected from the group of carbon fluoride and graphite, and a remainder of epoxy resin.

The present invention to be described in detail hereinbelow is characterized in that the composite material as described above is applied onto the outer peripheral surface of an original or prototype piston formed to have dimensions slightly smaller than those of a finally processed piston for subsequent heating at temperatures in the range of 90° to 230° C. for more than 20 minutes so as to form the covering layer, and thereafter, the internal combustion engine incorporated with the prototype piston thus formed with the covering layer is operated for the predetermined period of time, and thus, the piston profile obtainable after abrasion of the covering layer by the operation is regarded as the piston form required for the designing. By the above method according to the present invention, not only an accurate piston form is obtained by improving the degree of smoothness on the abraded surface of the covering layer, but the desired piston form is quickly available by increasing the amount of abrasion.

Figure 1:
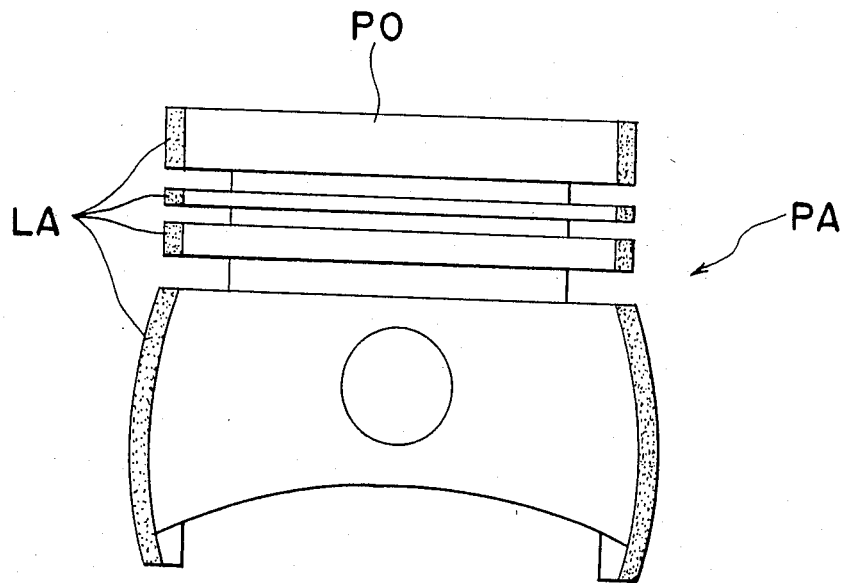
FIG. 1 is a side elevational view, partly in section, of a prototype piston formed with a covering layer according to the present invention in a state thereof before incorporation into an internal combustion engine for operation.
Figure 2:
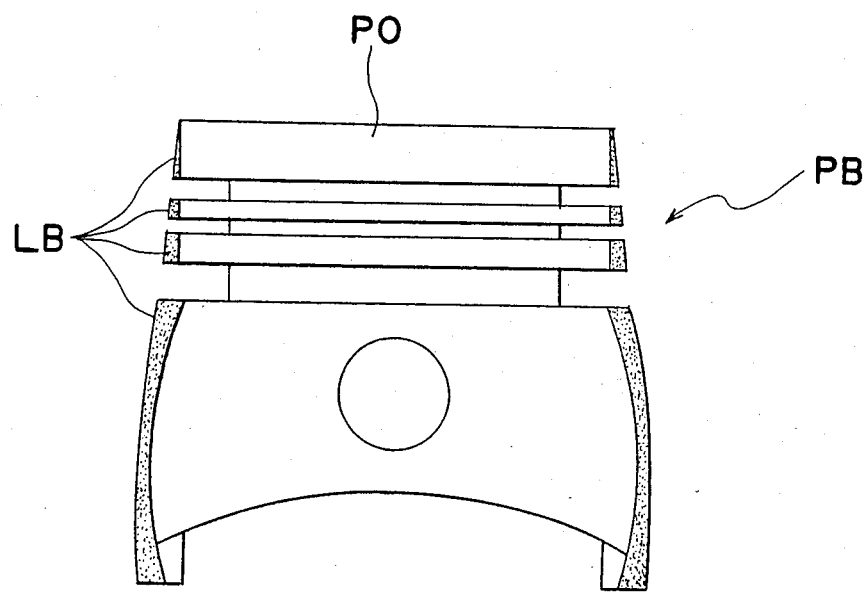
FIG. 2 is a view similar to FIG. 1, which particularly shows a state thereof after operation of the internal combustion engine.

Referring now to the drawings, there is shown in FIG. 1 an original piston or a prototype piston PO which may be applied to the present invention, and is formed into dimensions slightly smaller than those of a finally processed piston. Onto the outer peripheral surface of the prototype piston PO, a composite material composed of 25 to 45% by weight of flake aluminum, 2 to 30% by weight of a solid lubricant prepared from carbon fluoride (CF) or graphite (G), and a remainder of epoxy resin, is applied for a subsequent heating at temperatures in the range of 90° to 230° C. for a time period longer than 20 minutes to effect the baking, thereby to form a covering layer LA on the surface of the prototype piston PO so as to prepare the piston PA as shown in FIG. 1. The piston PA having the covering layer LA formed on its outer peripheral surface as described above is incorporated into an internal combustion engine (not particularly shown) for a subsequent operation thereof for a predetermined period of time, and thereafter, as shown in FIG. 2, a piston PB whose covering layer has been abraded as at LB to correspond to the configuration of the inner peripheral surface of the cylinder, is obtained. The profile of the piston PB thus obtained is regarded as a form of the piston required from the viewpoint of designing.

In the components of the above composite material, the epoxy resin is fully provided with the properties for the items (b), (f), (g) and (h) of the properties necessary for the covering layer as described earlier, i.e. the property for self-abrasion without damaging the mating part, feasibility for the thick coating and repeated coatings, buffering property and close adhesion (bonding force), etc., although rather insufficient in the properties for the items (a), (d) and (e), i.e. the heat resistance, resistance against abrasion and resistance against separation. The flake aluminum is effective for increasing the resistance against separation in the item (e), i.e. shearing strength, with a simultaneous improvement of the resistance against heat in the item (a).

Meanwhile, the carbon group solid lubricant composed of carbon fluoride or graphite has for its object to improve the resistance against separation, particularly to prevent the undesirable seizure, and is intended to maintain a lubrication with respect to the cylinder inner surface. Furthermore, since the carbon group solid lubricant as described above is superior in the dispersing property with respect to the mixture of epoxy resin and flake aluminum as compared with molybdenum disulfide ($MoS_2$) conventionally employed, it is effective for improving the smoothness on the surface of the abraded covering layer 1, while its rather inferior lubricating property as compared with molybdenum disulfide is useful for increasing the amount of abrasion of the covering layer 1, thus providing the property for the item (c) referred to earlier.

Accordingly, by causing epoxy resin to contain flake aluminum and carbon group solid lubricant composed of carbon fluoride or graphite, the resultant covering layer 1 may be provided with all the necessary properties for the items (a) to (h) as described previously.

It is to be noted here that the content of the flake aluminum is set in the range of 25 to 45% by weight, since the effects as explained earlier (i.e. improvements of resistances against separation and heat) can not be fully achieved if the content is less than 25% by weight, while the strength (i.e. close adhering force) of the covering layer 1 is reduced on the contrary due to saturation of the effect when the content exceeds 45% by weight.

On the other hand, the content of the carbon group solid lubricant is set in the range of 2 to 30% by weight, due to the fact that the abrasion proceeds too rapidly more than necessarily due to insufficient lubricating function if the content is less than 2% by weight; with a simultaneous difficulty for a uniform dispersion, while if the content thereof exceeds 30% by weight, the amount becomes excessive from the viewpoint of capacity, thus resulting in the insufficiency of the close adhering force, i.e. the strength of the covering layer 1.

Meanwhile, the content of the epoxy resin is set in the range of 25 to 73% by weight, i.e. in the range of the remaining % by weight, since the effects such as the self-abrasion without damaging the mating part, feasibility for the thick coating, etc. are not sufficiently achieved, with a particular reduction in the close adhesion and bondability with respect to the piston made of aluminum, if the content is less than 25% by weight, while when the content exceeds 73% by weight, the amounts of flake aluminum and carbon group solid lubricant become excessively small.

It should be also noted that the temperature for baking the composite material is set in the range of 90° to 230° C., since a sufficient bonding strength can not be obtained with respect to the piston, with a tendency to separation, if the temperature is lower than 90° C., whereas, when the temperature exceeds 230° C., the composite material is hardened excessively and thus, proper abrasion can not be expected, with a reduction in the strength of the piston itself.

Furthermore, the baking time of the above composite material is set to be longer than 20 minutes without any upper limit, since if the time period is shorter than 20 minutes, a sufficient bonding strength with respect to the piston can not be obtained, with a simultaneous reduction of hardness.

Hereinbelow, EXAMPLES are inserted for the purpose of illustrating the present invention without any intention of limiting the scope thereof.

EXAMPLE 1

Figure 3:
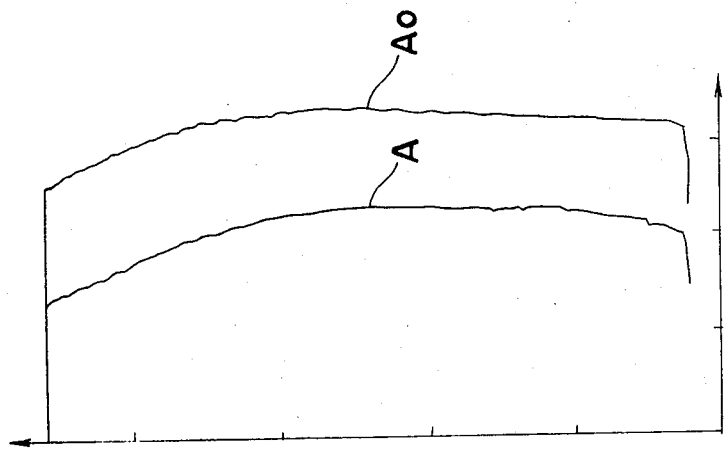
FIG. 3 is a characteristic diagram which represents a piston form in the case where carbon fluoride is employed for the covering layer according to a first embodiment of the present invention.

A composite material composed of 31% by weight of flake aluminum, 23% by weight of carbon fluoride, and a remaining portion of epoxy resin, was applied onto an outer peripheral surface of an original or prototype piston having external dimensions slightly smaller than those of a finally processed piston, and the prototype piston thus applied with the composite material was heated at a temperature of 180° C. for 30 minutes to form a covering layer thereon. Subsequently, the piston thus formed with the covering layer was built into a gasoline engine with a displacement of 1500 cc and the gasoline engine was operated for 5 hours under a state of full speed at revolutions of 5500 rpm. Thereafter, the piston was taken out of the gasoline engine for investigations into the form or profile of piston obtained after abrasion of the covering layer, the results of which are shown in FIG. 3, wherein Ao represents the outer peripheral surface of the piston before the operation and A denotes that after the operation. The radii of pistons are plotted in the abscissa, while axial dimensions of the pistons are given in the ordinate.

EXAMPLE 2

Figure 4:
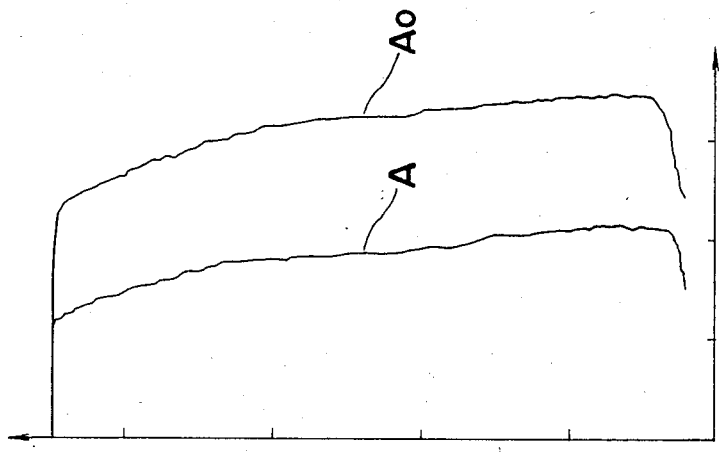
FIG. 4 is a characteristic diagram which represents a piston form in the case where graphite is employed for the covering layer according to a second embodiment of the present invention.

With the exception that the composite material in EXAMPLE 1 was replaced by a composite material composed of 31% by weight of flake aluminum, 23% by weight of graphite and a remaining portion of epoxy resin, a similar prototype piston was subjected to the same treatment as that in EXAMPLE 1, and the piston form thus obtained was investigated, the findings of which are shown in FIG. 4.

Comparative data 1 (conventional data)

The data corresponds to the prior art data described earlier, and in the process of the above EXAMPLE 1, carbon fluoride as the solid lubricant was replaced by the same amount of molybdenum disulfide for this data, with the baking temperature being set at 100° C. so as to impart the minimum necessary abrasion property required for the determination of the piston form. The results of the study on the form of the piston thus prepared are shown in FIG. 5.

Comparative data 2 (reference data)

The data is intended to clearly show the difference in the effects between EXAMPLES 1 and 2, and in the process of EXAMPLE 1, carbon fluoride as the solid lubricant was replaced by the same amount of carbon for this data. The results of the study on the form of the piston obtained in this data are given in FIG. 6.

Figure 6:
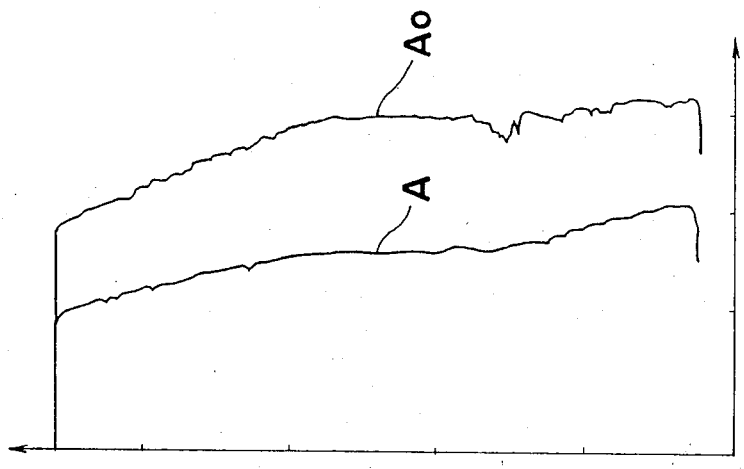
FIG. 6 is a characteristic diagram which represents a piston form in the case where carbon is employed for the covering layer in comparative data 2.
Figure 5:
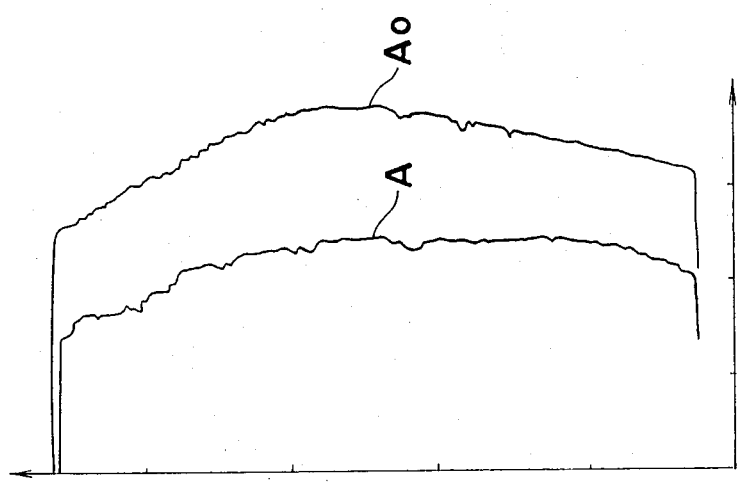
FIG. 5 is a characteristic diagram which represents a piston form in the case where molybdenum disulfide is employed for the covering layer in comparative data 1.

As is seen from FIGS. 3 through FIG. 6, in EXAMPLE 1 of FIG. 3 and EXAMPLE 2 of FIG. 4, the outer peripheral surfaces A of the pistons obtained through the abrasion have a less undulation or concave-convex portions with a higher grade of smoothness, than those in the comparative data of FIGS. 5 and 6. Particularly, the smoothness thereof in EXAMPLE 1 of FIG. 3 is extremely superior, thus providing an accurate piston form.

Meanwhile, with respect to the amount of abrasion, i.e. the difference in the radii between the piston outer peripheral surface Ao before the operation and the piston outer peripheral surface A after the operation, EXAMPLES 1 and 2 of FIGS. 3 and 4 show the difference in the radii similar to that in the comparative data 1, although EXAMPLES 1 and 2 employ the baking temperature higher than that in the comparative data 1 in FIG. 5. Accordingly, it is seen that, in the present invention, the piston form required from the viewpoint of designing may be more quickly obtained than in the conventional practices.

Subsequently, investigations will be made into the reasons why the superior smoothness is available by the practices of EXAMPLES 1 and 2.

Figure 7:
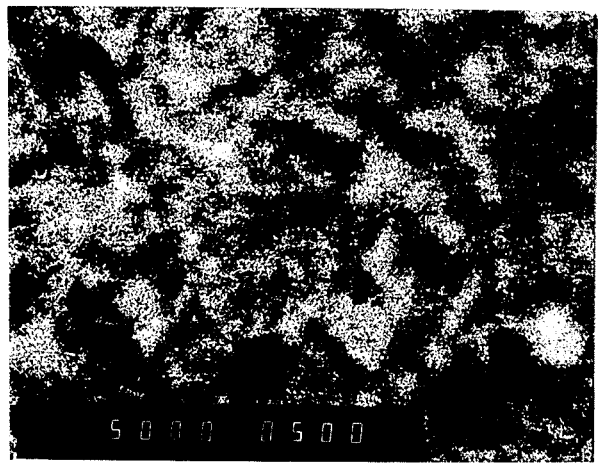
FIGS. 7 through 9 are microscopical photographs at a magnification of 500 showing state of dispersion of solid lubricants, i.e. carbon fluoride, graphite and molybdenum disulfide, respectively.
Figure 8:
Figure 9:
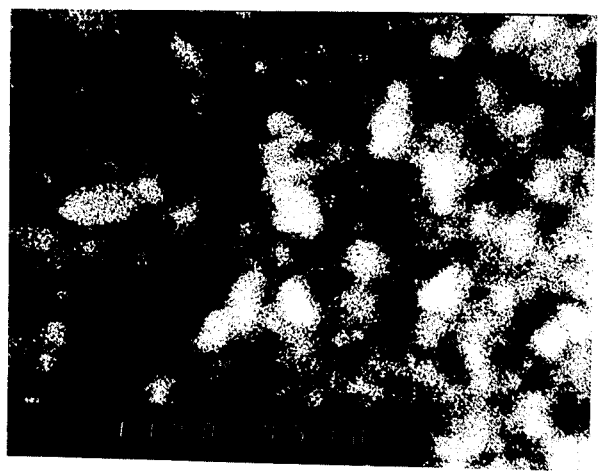

Owing to the fact that the smoothness as described above is considered to be related to the state of dispersion of the solid lubricant, such state of dispersion was studied by EPMA (Electron probe micro-analyser) with respect to the respective solid lubricants of carbon fluoride, graphite, and molybdenum disulfide, the results of which are shown in microscopic photographs in FIGS. 7 through 9, in which white portions represent the solid lubricants. FIG. 7 shows the state of dispersion of carbon fluoride in the composite material employed in EXAMPLE 1, FIG. 8 denotes the state of dispersion of graphite in the composite material employed in EXAMPLE 2, and FIG. 9 shows the state of dispersion of molybdenum disulfide in the composite material of the comparative data 1 respectively.

As is seen from the microscopic photographs of FIGS. 7 through 9, carbon fluoride in FIG. 7 is in a generally uniform and an extremely favorable state of dispersion, and graphite of FIG. 8 is also in a generally favorable state of dispersion, while molybdenum disulfide in FIG. 9 is in a deviated non-uniform state of dispersion, with the dispersing property being arranged in the order as follows.

Molybdenum disulfide < graphite < carbon fluoride.

The above order is in agreement with the order of the degree of smoothness, and fully supports the fact that the difference in the degree of smoothness results from the difference of the dispersing property.

As is clear from the foregoing description, according to the present invention, an accurate piston form may be obtained, since the outer peripheral surface of the piston available through abrasion has a high degree of smoothness. Furthermore, due to the fact that the amount of abrasion is large as compared with that in the conventional practices, the required piston profile may be rapidly obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of determining a form of a piston for an internal combustion engine, which comprises the steps of preparing a prototype piston having dimensions slightly smaller than those of a finally processed piston; applying to an outer peripheral surface of said prototype piston, a composite material composed of 25 to 45% by weight of flake aluminum, 2 to 30% by weight of graphite, and a remainder of epoxy resin; heating the prototype piston thus applied with the composite material at temperatures in the range of 90° to 230° C. for more than 20 minutes to form a covering layer on the prototype piston; incorporating said prototype piston thus formed with the covering layer into the internal combustion engine; operating the prototype piston for a predetermined period of time, thereby abrading the covering layer of the piston to form an external configuration corresponding to the internal configuration of a cylinder liner of said internal combustion engine; and utilizing the configuration obtained through abrasion of said covering layer in the design of a production piston.

2. A method of determining a form of a piston for an internal combustion engine, which comprises the steps of preparing a prototype piston having dimensions slightly smaller than those of a finally processed piston; applying to an outer peripheral surface of said prototype piston, a composite material composed of 25 to 45% by weight of flake aluminum, 2 to 30% by weight of polycarbon monofluoride, and a remainder of epoxy resin; heating the prototype piston thus applied with the composite material at temperatures in the range of 90° to 230° C. for more than 20 minutes to form a covering layer on the prototype piston; incorporating said prototype piston thus formed with the covering layer into the internal combustion engine; operating the prototype piston for a predetermined period of time, thereby abrading the covering layer of the piston to form an external configuration corresponding to the internal configuration of a cylinder linear of said internal combustion engine; and utilizing the configuration obtained through abrasion of said covering layer in the design of a production piston.

* * * * *